United States Patent [19]

Bonneau et al.

[11] Patent Number: 5,636,340
[45] Date of Patent: Jun. 3, 1997

[54] SYSTEM AND METHOD FOR SPECIAL EFFECTS FOR TEXT OBJECTS

[75] Inventors: Paul R. Bonneau, North Bend; Christopher A. Mason, Woodinville, both of Wash.

[73] Assignee: Microsoft Corporation, Redmond, Wash.

[21] Appl. No.: 334,629

[22] Filed: Nov. 3, 1994

[51] Int. Cl.$^6$ .................................................. G06T 13/00
[52] U.S. Cl. ........................ 395/761; 395/167; 395/173; 345/124
[58] Field of Search ........................... 395/144, 148, 395/151, 159, 161, 152; 345/122, 124, 141

[56] References Cited

U.S. PATENT DOCUMENTS 5,325,478  6/1994  Shelton et al. ........................... 395/148

OTHER PUBLICATIONS

Authorware Professional for MacIntosh, Macromedia, Inc., Dec. 1992, pp. 301–309.
Petzold, "Palette animation techniques under Windows 3.0", PC Magazine, v10, n7, Apr. 1991, pp. 345–349.
Heck, "Director 4.0 for Windows", InfoWorld, v16, n44, Oct. 1994, pp. 104–110.
Moskowitz, "PCs, Macs square off in presentation arena", PC Week, v5, n46, Nov. 1988, pp. 133–138.
Simone, "Bring your business presentations to life with Autodesk's Animator", PC Magazine, v9, n15, Sep. 1990, p. 371.
Davis, "Move it", MacUser, v4, n11, Nov. 1988, p. 33.
"Creative Writer Software Review", PC Magazine, v13, n11, Jun. 1994, p. 477.
Authorware Professional for MacIntosh, Macromedia, Inc., Dec./1992, pp 257–259 and 312.

*Primary Examiner*—Heather R. Herndon
*Assistant Examiner*—Stephen Hong
*Attorney, Agent, or Firm*—Seed and Berry LLP

[57] ABSTRACT

A system and method for creating and displaying dynamic special effects on graphic text objects. Preferably, the special effects are displayed in stages or animation frames, such that the special effects appear to move. In addition, the special effects preferably are displayed for a predetermined period and then the original text objects are redisplayed without the special effects. The system and method include alternate embodiments for displaying at least three different dynamic special effects: fade-out, shimmer, and sparkle. The fade-out embodiment erases progressively larger portions of a selected text object with each animation frame. The shimmer embodiment shifts consecutive rows or column of pixels of the selected text object in opposite directions with each animation frame. The sparkle embodiment displays random pixel patterns, referred to as sparkle grids, over random locations of the selected text object.

12 Claims, 9 Drawing Sheets

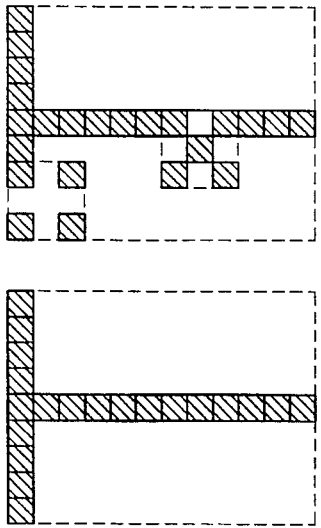
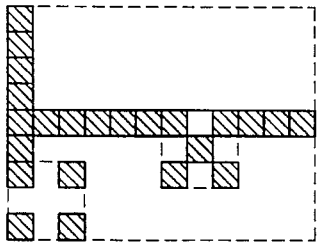
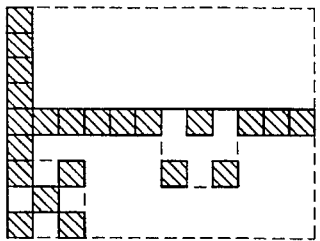
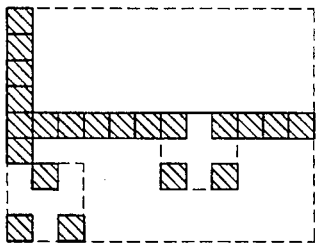
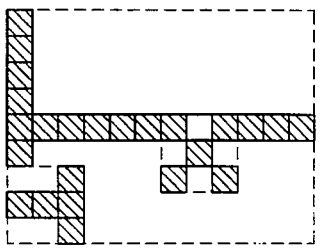
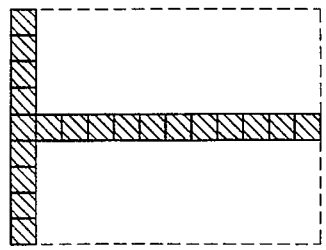
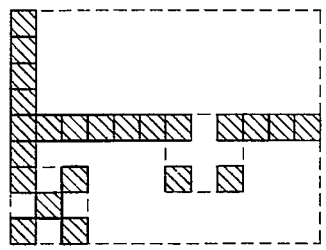
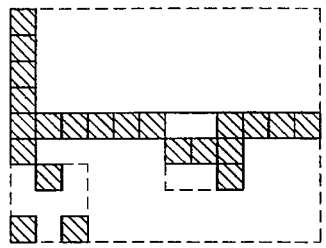
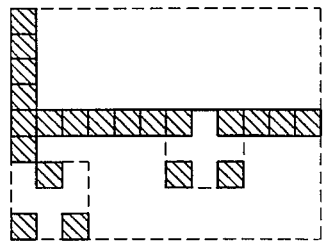
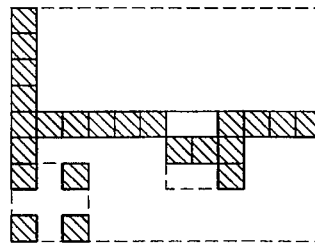

SYSTEM AND METHOD FOR SPECIAL EFFECTS FOR TEXT OBJECTS

TECHNICAL FIELD

The present invention relates generally to computer graphics and, more specifically, to a system and method for creating and displaying dynamic special effects on graphic text objects.

BACKGROUND OF THE INVENTION

For many reasons, users of computer application programs, such as word processing, database, and spreadsheet programs, have desired the ability to highlight particular text displayed on a computer display screen. Many application programs include utilities, such as bolding and italicizing utilities, that allow selected text of a document to be highlighted on a display screen and on a printed paper copy. While such highlighting utilities have proved useful, many users have found existing highlighting utilities to be inadequate for several reasons.

First, some users have desired more highlighting utilities, in addition to the conventional bolding and italicizing. For example, many application programs are now directed primarily to children, who often enjoy many special effects and new features. It is unlikely that many children find the existing highlighting utilities to be new and exciting. In addition, it is likely that many adults would also find other highlighting utilities to be enjoyable and useful.

Second, some users would like to display highlighted text and print the text without highlighting, but existing highlighting utilities, such as bolding and italicizing, alter the way that the text is both displayed and printed. In fact, one reason why more highlighting types have not been created might be because developers thought that users would want to print any highlighting that was displayed, but printer technology did not allow some other highlighting types to be printed. However, as computer networks have proliferated, many documents, such as electronic mail, are passed between users without being printed. As a result, users may wish to highlight certain portions of text with new highlighting types without concern about whether the highlighting type could be printed. In addition, many users, particularly children, enjoy displaying fancy text and graphics, without caring whether such text and graphics can be printed.

Third, existing highlighting features are static in nature. That is, when a user alters a text portion with an existing highlighting feature, such as bolding, the highlighted text remains highlighted until the user manually turns off the highlighting feature. It is well known that a dynamic feature, such as a flashing traffic light, stands out more than a static feature like bolding.

SUMMARY OF THE INVENTION

The present invention is directed to a system and method for creating and displaying dynamic special effects on graphic text objects. Preferably, the special effects are displayed in stages or animation frames, such that the special effects appear to move. In addition, the special effects are displayed for a predetermined period and then the original text objects are redisplayed without the special effects.

The invention includes alternate embodiments for displaying at least three different dynamic special effects: fade-out, shimmer, and sparkle. the fade-out embodiment erases progressively larger portions of a selected text object with each animation frame. The shimmer embodiment shifts consecutive rows or column of pixels of the selected text object in opposite directions with each animation frame. The sparkle embodiment displays random pixel patterns, referred to as sparkle grids, over random locations of the selected text object.

By providing dynamic special effects, the invention allows users to highlight text objects in ways previously unavailable. The invention enables children's application programs to be much more enjoyable and exciting to the children who use them. In addition, the invention enables users of computer networks to more noticeably highlight passages of text with dynamic special effects without concern for whether the special effects can be printed.

BRIEF DESCRIPTION OF THE DRAWINGS

FIG. 9A to 9K are examples of a text block being sparkled according to the method shown in FIG. 8.

DETAILED DESCRIPTION OF THE INVENTION

The present invention is directed to a system and method for creating and displaying dynamic special effects on graphic text objects. The special effects change the way in which the text objects are displayed on a computer display and include, for example, "fade out," "shimmer," and "sparkle" special effects. Preferably, the special effects are displayed in stages or animation flames, such that the special effects appear to move, that is, the special effects are "dynamic". In addition, the special effects preferably are displayed for a predetermined period and then the original text objects are redisplayed without the special effects.

By providing dynamic special effects, the invention allows users to highlight text objects in ways previously unavailable. The invention enables children's application programs to be much more enjoyable and exciting to the children who use them. In addition, the invention enables users of computer networks to more noticeably highlight passages of text with dynamic special effects without concern for whether the special effects can be printed.

Figure 1:
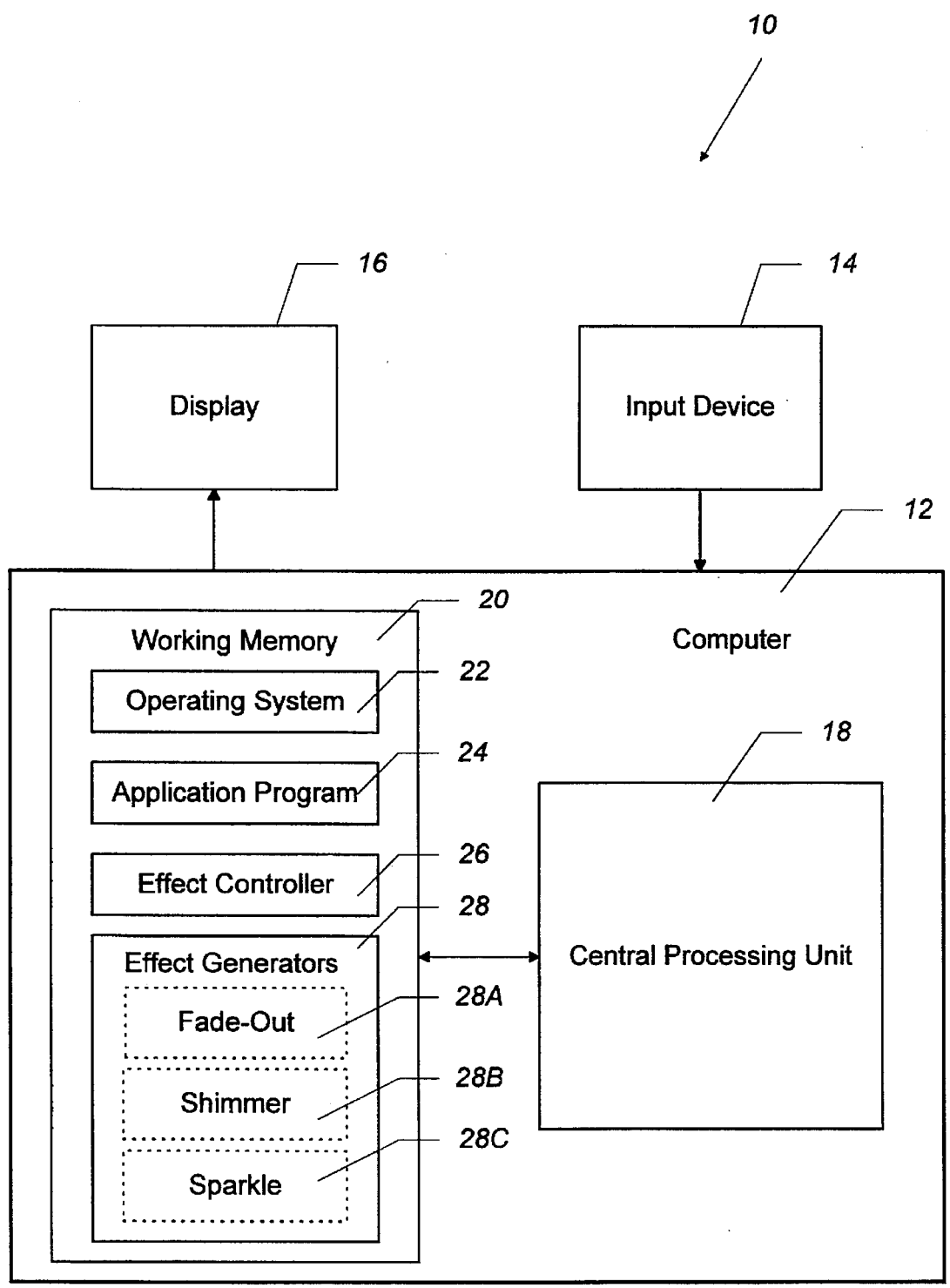
FIG. 1 is a block diagram of a computer system according to the present invention.

FIG. 1 shows a special effect system 10 used to create and display dynamic special effects on graphic text objects. The system 10 includes a computer 12 connected to receive input from an input device 14 and send display output to a display 16. The computer 12 can be implemented as any conventional computer, such as a conventional desktop computer.

The input device 14 also is conventional and can include such devices as a keyboard, a mouse, and an electronic pen with a digitizing tablet. The display 16 is also conventional and preferably is a high-resolution, color display, such as a cathode ray tube (CRT) monitor.

As is conventional, the computer 12 includes a central processing unit 18 and a working memory 20. Stored in the working memory 20 is an operating system 22, an application program 24, an effect controller 26, and one or more effect generators 28. In a preferred embodiment, the effect generators 28 include a fade-out effect generator 28A, a shimmer effect generator 28B, and a sparkle effect generator 28C. The operating system 22 can be any conventional operating system such as Microsoft Windows™. The operating system 22 interfaces the application 24 with the input device 14 and a display 16 such that the application program 24 can receive user input from the input device and can display data on the display 16. In some embodiments, the effect controller 26 and the effect generators 28 are a part of the operating system 22 or the application program 24. However, preferably the effect controller and the effect generators are independent utility programs so that many application programs can use their special effects abilities without copying them into each application program. In a preferred embodiment, the application program is generally a conventional text processor that has been modified slightly to interface with the effect controller 26 and the effect generators 28.

Figure 2A:
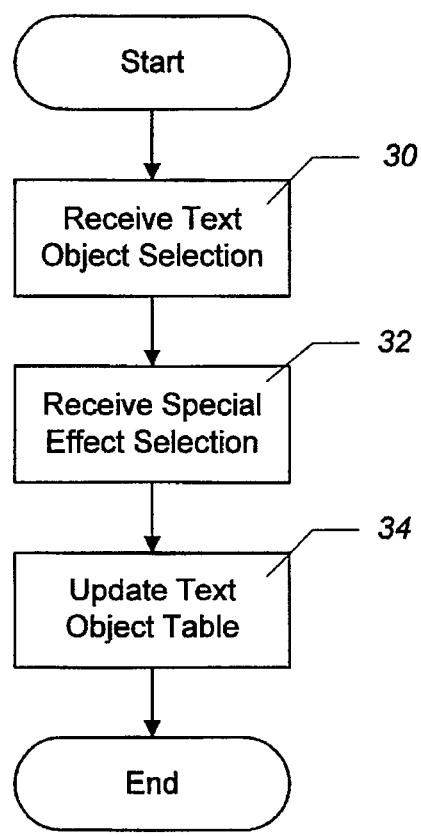
FIG. 2A is a flow diagram of a method of inputting a special effects selection according to the,present invention.

FIG. 2A shows a flow diagram of a method used by the application program 24 to obtain user input for the effect controller 26 and the effect generators 28. In step 30, the application program receives a text object selection from the user via the input device 14. The selected text object includes a string of one or more characters, and a portion of the background surrounding the characters, such that the characters and the background portion form a rectangular text object. Such a text object selection step typically is accomplished by dragging a cursor across the selected text using a mouse as the input device 14. In step 32, the application program receives from the user a special effects selection that indicates which special effect the user desires to be displayed. Such a special effect selection is similar to the way conventional word processors select bolding or italicizing of selected text.

In step 34, the application program 24 updates a text object table stored in the working memory, such that the text object table indicates that the text object selected in step 30 is associated with the special effect selected in step 32. The text object table is a device typically used in application programs to indicate the font, bolding, italicizing, and similar features, and associated with each string of text. The text object table stores the location of each text object and codes that indicate the features associated with the text object. By storing in the text object table a code associating the special effect with the selected text object, the text object can be edited and the special effect is automatically associated with the edited text object. The following Table A shows an example of a preferred text object table.

TABLE A

|  | File Name | File Pos. | Char. Pos. | Feature 1 | Feature 2 | Feature N |
|---|---|---|---|---|---|---|
| Object 1 | File 1.txt | 80 | 0 | Bold | | |
| Object 2 | File 2.txt | 10 | 40 | Fade-Out | | |
| Object 3 | File 1.txt | 130 | 60 | Italics | Shimmer | |
| Object N | | | | | | |

In the example shown in Table A, only the text objects for a single display line of text are shown for simplicity, but the same table preferably would store feature information for all of the text objects of the document. Text objects 1 and 3 are stored in a first file, File 1.txt, at positions 80 and 130. Text object 2 is stored in a second file, File 2.txt, at position 10. The character position field stores the position of the first character of each text object. The length of each text object can be computed for each text object by subtracting the character position for that text object from the character position for the next text object, so the first text object has a length of 40 (40–0). Preferably, each text object can have a variable number of features specified, ranging from 0 features, which displays the text object with a default character format, to a number of features N limited only by the amount of memory available.

Figure 2B:
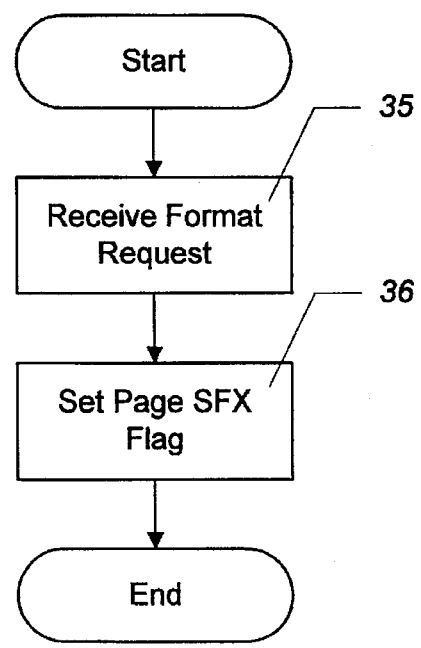
FIG. 2B is a flow diagram of a method of preparing a page for display according to the present invention.

In order to display the text objects with special effects, the page on which the text objects are located must be formatted. As shown in step 35 of FIG. 2B, one method of triggering the application program to format the page is by receiving from the operating system 22 a format request, such as a Microsoft Windows™ $WM_{13}$ Paint message. In step 36, the application program sets a page special effect (SFX) flag which indicates that the page on which the selected text object is located includes such a text object that has been selected to receive a special effect. The page SFX flag preferably is a part of a stored page descriptor table that describes characteristics of each page such as the print and display margins of the page. Such a page descriptor table is a well known device for storing page formatting information. Of course, the application program may perform other formatting in addition to setting the page SFX flag, such as adjusting margins or conventional formatting.

Figure 3:
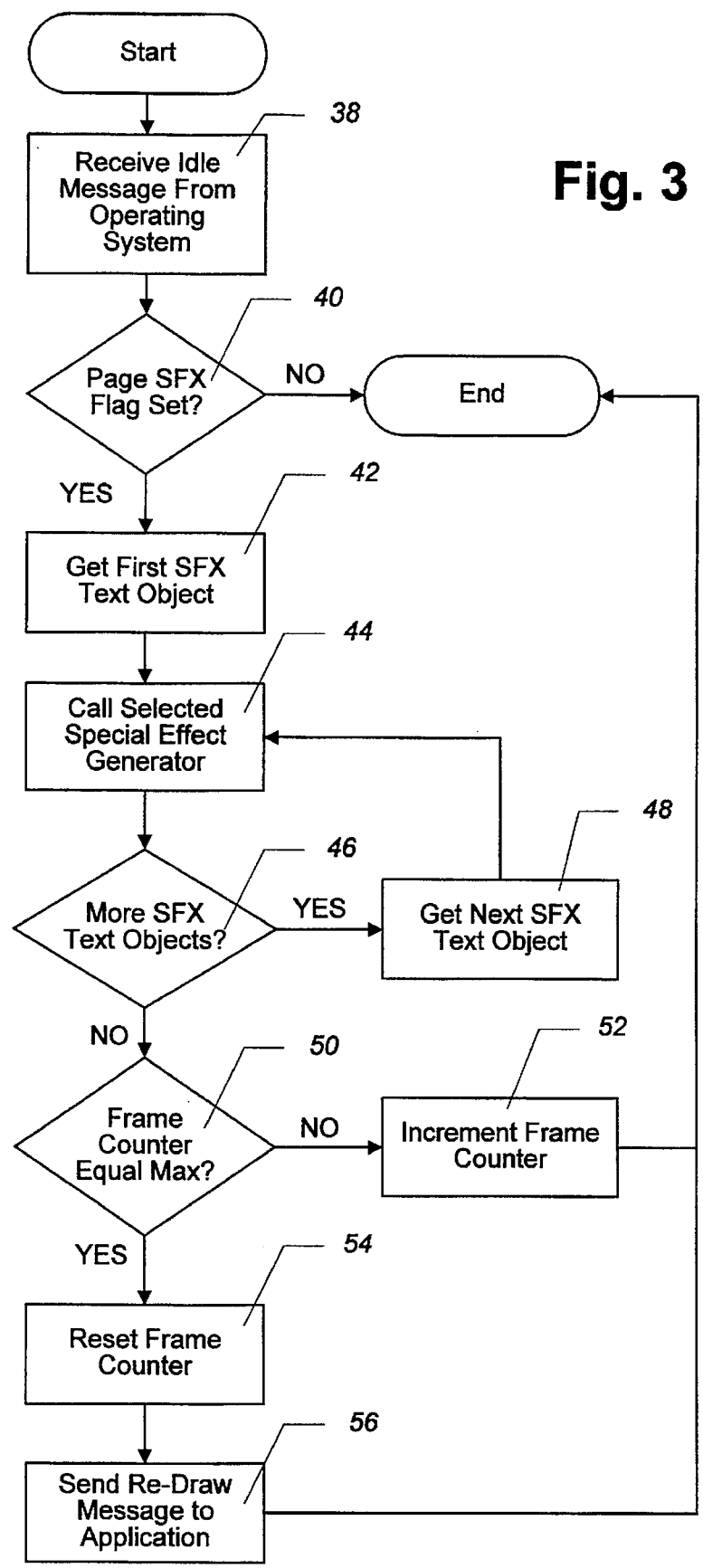
FIG. 3 is a flow diagram of a special effect controller according to the present invention.

Shown in FIG. 3 is a flow diagram of a method employed by the effect controller 26 to cause the selected special effects to be displayed. In step 38, the effect controller receives an idle message from the operating system 22, indicating that the effect controller can spend processor time to display the selected special effects. When the application program is not processing data, it sends such an idle message via the operating system 22. Of course, one skilled in the art could easily employ the invention in non-message-based systems.

In step 40, the effect controller 26 determines whether the page SFX flag has been set for the current page displayed by the application program. Although the invention is easily applicable to application programs that can display multiple pages at one time, the discussion herein is limited to a single current page for simplicity. If the page SFX flag is not set, then the effect controller returns processing to the operating system 22.

If the page SFX flag is set, then in step 42, the effect controller gets the first text object selected to receive a special effect (SFX text object). The effect controller locates the first SFX text object by searching through the text object table until it finds a text object with a special effect indicator associated with it. In step 44, the effect controller calls the effect generator 28 for the special effect associated with the text object. The effect generator generates a first animation frame of the special effect on the text object, examples of which are discussed below with respect to FIGS. 4–9. Preferably, the special effects are displayed in the order in which the SFX text objects appear in the text object table. However, any order could be employed, such as displaying the special effects on all SFX text objects having a first special effect selection before displaying any other special effects.

When the effect generator 28 is done generating the special effect on the selected text object, the effect controller 26 determines whether there are more SFX text objects in step 46. The effect controller determines whether there are more SFX text objects by searching through the text object table beginning with the text object immediately following the previous SFX text object. If there are more SFX text objects, then in step 48, the effect controller gets the next SFX text object. Steps 44–48 are then repeated until no more SFX text objects are found for the current page in step 46.

If there are no more SFX text objects for the current page, then the effect controller 26 determines whether a frame counter equals a maximum counter value (MAX) in step 50. The frame counter counts the number of animation frames of the special effect to be displayed and is initialized by the operating system when the effect controller is loaded. In a preferred embodiment, there are 8 animation frames for each special effect, so the frame counter is incremented from 1 to 8 for all of the text objects. Preferably, one animation frame for each text object is displayed before displaying the next animation frame for any of the text objects. Alternatively, all animation frames of the special effect for one text object could be displayed before displaying any animation frames for the next text object.

If the frame counter is not equal to MAX, then in step 52, the effect controller increments the frame counter and returns control to the operating system. Upon each subsequent idle message sent from the operating system 22, the effect controller repeats steps 38–52 until the frame counter equals MAX as determined in step 50. As will be appreciated, steps 38–52 enable a special effect to be displayed for each text object one animation frame at a time with each animation frame being counted by the frame counter. When the frame counter equals MAX, then in step 54 the effect controller resets the frame counter to zero for the next set of animation frames. In step 56, the effect controller calls the application program 24 and requests the application program to redraw each text object without the selected special effects. The application program redraws the text object without the selected special effects. When the application program 24 is finished processing, the operating system 22 sends another idle message to the effect controller 26 to start the process of displaying the special effects again. Preferably, each selected text block is displayed without a special effect for an amount of time at least as long as one animation frame.

Figure 4:
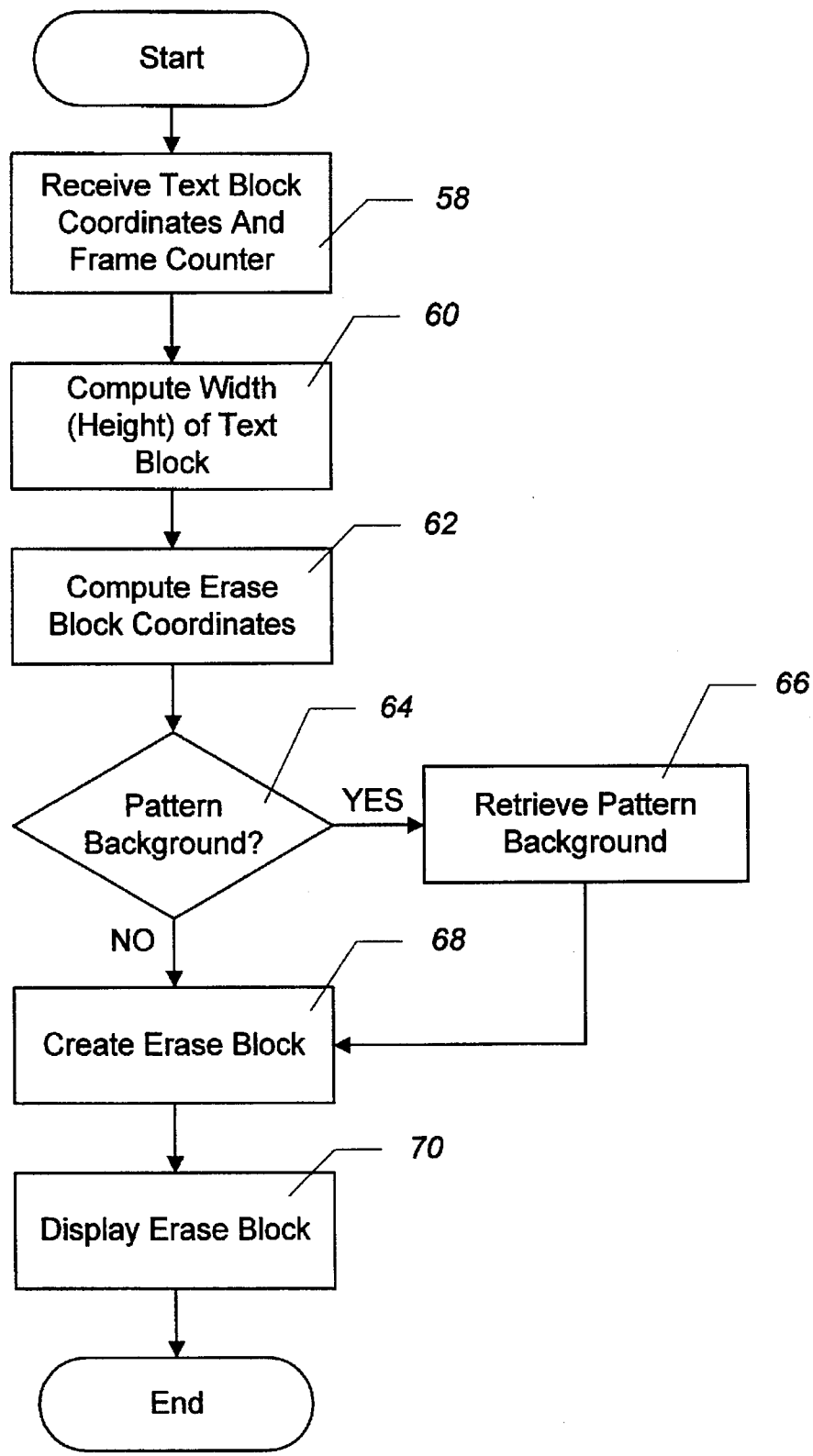
FIG. 4 is a flow diagram of a fade-out special effect generator method according to the present invention.
Figure 5K:
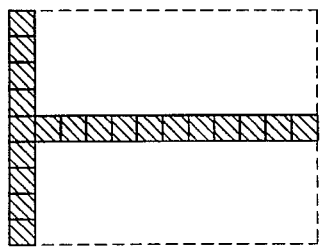
FIGS. 5A to 5K are examples of a text block being faded out according to the method shown in FIG. 4.
Figure 5E:
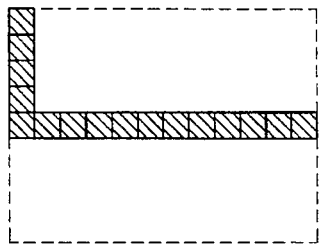
Figure 5J:
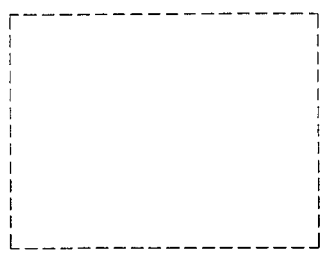
Figure 5D:
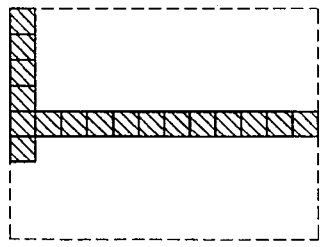
Figure 5I:
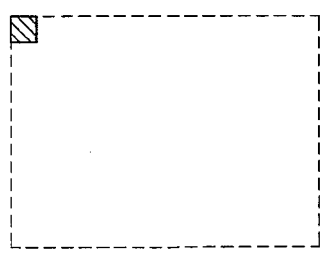
Figure 5C:
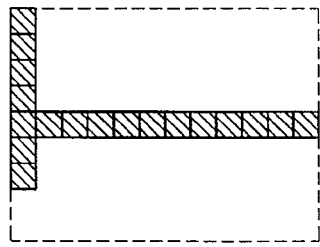
Figure 5H:
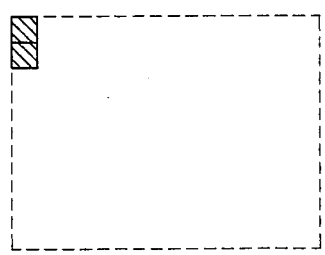
Figure 5B:
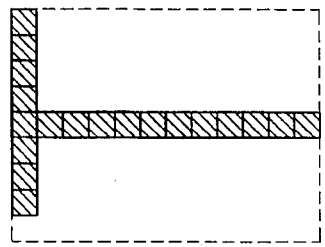
Figure 5G:
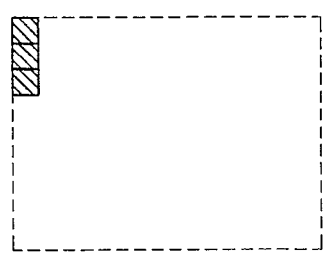
Figure 5A:
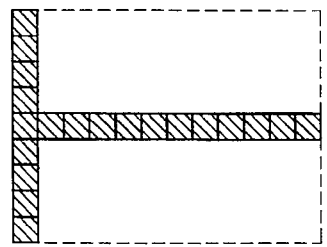
Figure 5F:
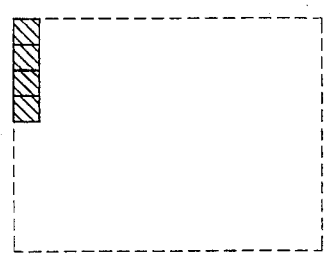

Shown in FIG. 4 is a method employed by the fade-out effect generator 28A to progressively fade out or erase the text block. In step 58, the fade-out effect generator 28A receives the frame counter and the coordinates of the selected text block. Typically, the upper-left and lower-right coordinates are the only coordinates used to describe each text block. In step 60, the width or height of the text block is computed. The width is computed if the fade out is performed in a left-to-right or a right-to-left direction. Likewise, the height is computed if the fade out will proceed from top to bottom or bottom to top. For simplicity, the remainder of the discussion will assume that the fade out occurs from left to right, although the fade-out method in the other directions will be completely understood from that discussion.

In step 62, the fade-out effect generator 28A computes X-Y coordinates of an erase block that is displayed instead of increasing portions of the text block to thereby erase the text block. The erase block is the same color and pattern, if any, of the background of the text block, so displaying the erase block instead of the text block erases the text piece of the text block. Given that the fade out begins from the left side in this example, the X-Y coordinates of the upper left corner of the erase block are the same as the coordinates of the upper left corner of the text block. In a preferred embodiment, the fade out occurs over the entire height of the text block so that the Y coordinate of the lower right corner of the erase block is the same as the Y coordinate of the lower right corner of the text block. The X coordinate of the lower right corner of the erase block is equal to the width of the text block multiplied by the frame counter and divided by the maximum frame counter value (MAX). For example, assuming that MAX equals 8 and the first frame counter value is 1, then the width of the erase block is ⅛th of the width of the text block. Upon each increment of the frame counter, the erase block increases by ⅛th of the text block until the erase block equals the size of the text block when the frame counter equals 8 . At that time, the erase block completely replaces the text block which, in effect, erases the text block. Upon completion of the last animation frame, the effect controller sends a message to the application program 24 to re-draw the text block in place of the erase block.

In step 64, the fade-out effect generator 28A determines whether the text block is displayed over a pattern background or a plain white background. For example, in a preferred embodiment, the application program allows the text to be displayed over any of numerous pattern backgrounds, such as a background picture of a teddy bear. If there is a pattern background, then in step 66, the portion of the pattern background corresponding to the coordinates of the erase block is retrieved. In step 68, the fade-out effect generator creates the erase block from either the pattern background retrieved in step 66 or a plain white background if there is no pattern background. In step 70, the fade-out effect generator displays the erase block over the text block, which in effect erases the left-most ⅛th of the text block according to the example above. Each time that the fade-out effect generator is called, steps 58–70 are repeated to erase an additional ⅛th of the text block as described above. In a preferred embodiment, steps 66–70 are actually one combined step in which the effect generator simply displays whatever background corresponds to the coordinates computed in step 62.

Shown in FIG. 5 is an example of a text block being faded out by the fade-out effect generator 28A as described in FIG. 4. Frame (a) shows the text block in its original form without any special effect. Frames (b)–(j) show the text block being faded out and frame (k) shows the text block as re-drawn by the application program.

Referring again to the method shown in FIG. 4, the fade-out effect generator 28A receives a frame counter of 1 and text block coordinates of (0,0) and (9,12) in step 58. In step 60, the X value (9) of the lower-right corner minus the X value (0) of the upper-left corner equals the width (9) of the text block. In step 62, the X value of the lower-right corner of the first erase block is computed to be 1, which equals the text block width (9) multiplied by the frame counter (1) divided by the maximum frame counter (MAX), which is 9 in this example. As discussed above, the upper-left coordinates and the lower-right Y coordinates remain the same, resulting in erase block coordinates of (0,0) and (1,12). In this example, there is no background pattern, so the fade-out effect generate creates and displays a white erase block in steps 68 and 70 as shown in frame (b). Frames (c) through 0) are generated in a similar manner.

Figure 6:
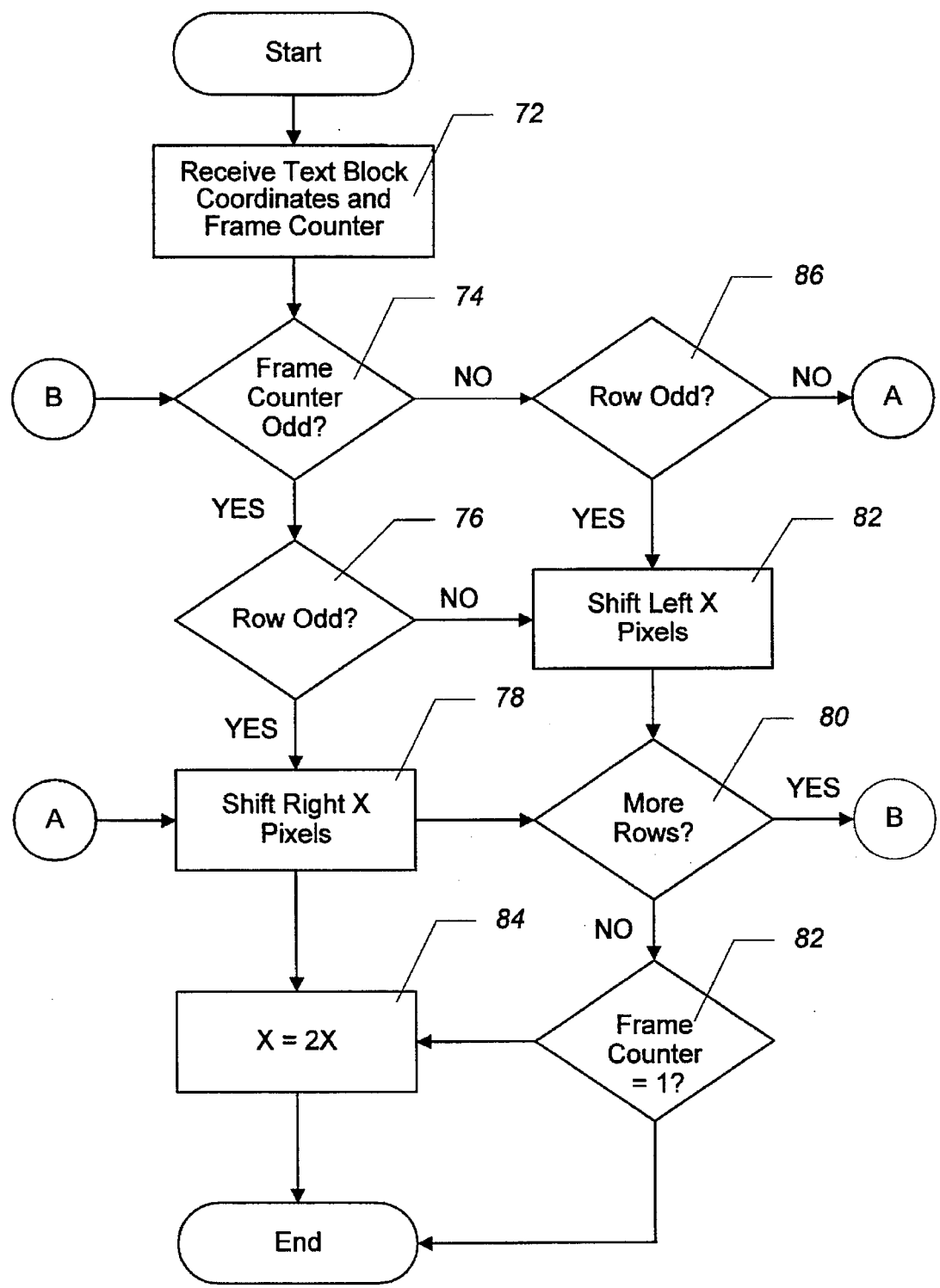
FIG. 6 is a flow diagram of a shimmer special effect generator method according to the present invention.
Figure 7A:
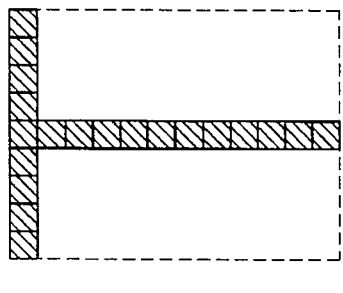
FIG. 7A to 7J are examples of a text block being shimmered according to the method shown in FIG. 6.
Figure 7B:
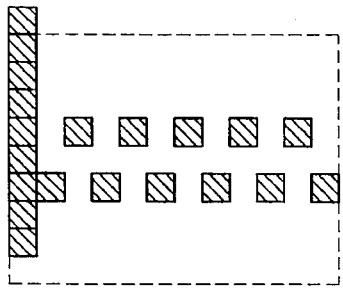
Figure 7C:
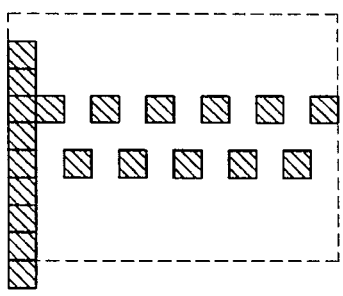
Figure 7D:
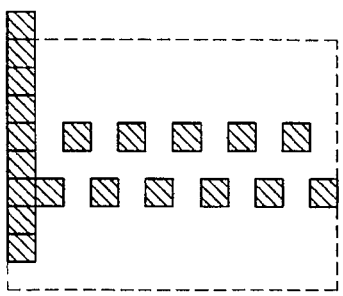
Figure 7E:
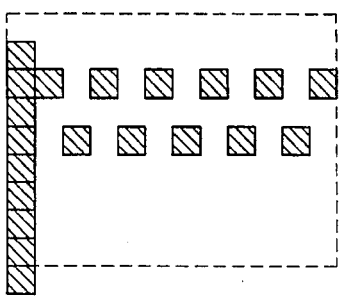
Figure 7F:
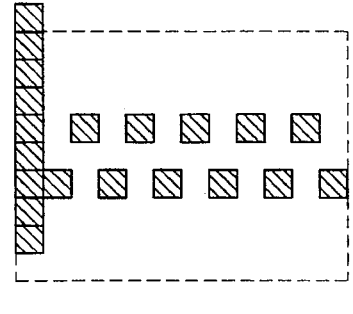
Figure 7G:
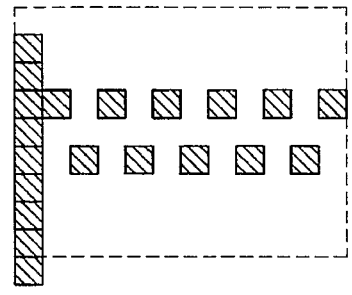
Figure 7H:
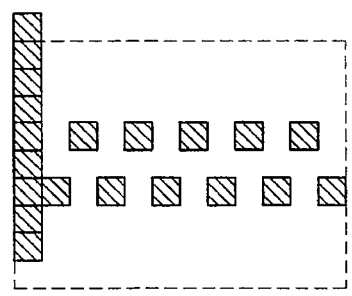
Figure 7I:
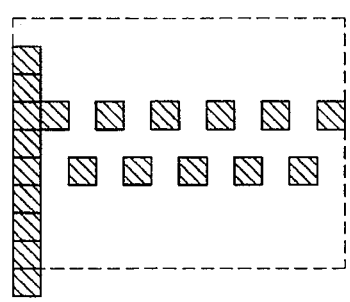
Figure 7J:
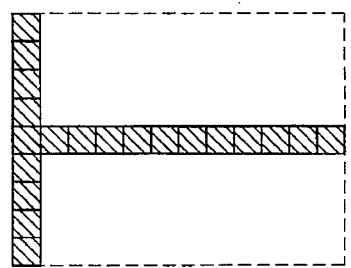

Shown in FIG. 6 is a method employed by the shimmer effect generator 28B that causes a selected text block to "shimmer." The shimmer effect is implemented by shifting odd pixel rows of the text block in one direction while shifting even pixel rows in the opposite direction. Each time the frame counter is incremented, each pixel row shifts in a direction opposite to the direction that the row shifted on the previous frame counter.

In step 72, the shimmer effect generator 28B receives the frame counter and the coordinates of the selected text block. In step 74, the shimmer effect generator determines whether the frame counter is an odd number. In the preferred embodiment, the frame counter starts at 1, which is odd, so execution proceeds to step 76 where the shimmer effect generator determines whether the current pixel row is odd. Since the first row is odd, the shimmer effect generator shifts the pixel row to the right X number of pixels in step 78. In step 80, the shimmer effect generator determines whether there are more rows to be shifted. If so, then execution returns to perform steps 74 and 76 again. In step 76, the shimmer effect generator determines that the second row is not odd so it shifts the second pixel row left X pixels in step 82. Steps 74–82 are repeated until all the rows have been shifted as determined by step 80.

When there are no more rows, then in step 82, the shimmer effect generator determines whether the frame counter equals 1. If so, then in step 84, the X value, which equals the number of pixels each row is shifted, is multiplied by 2. That multiplication by 2 enables each subsequent animation frame of the shimmer effect to be shifted twice as far when the frame counter equals 2–8 as when the frame counter equals 1. Otherwise, when each pixel row is shifted in the opposite direction when the frame counter is incremented, the rows would simply be returned by their initial state.

After the frame counter is incremented to 2 by the effect controller in step 54 (FIG. 3), then in step 74 (FIG. 6) the frame counter is determined to be not odd. As a result, in step 86 the shimmer effect generator 28B determines whether the current row is odd. Because the first row is odd, the first row is shifted left X pixels in step 82. Steps 78, 80, 82, and 86 are repeated until all rows are shifted as determined in step 80.

Shown in FIG. 7 is an example of a text block being shimmered by the shimmer effect generator 28B as described in FIG. 6. In this example, like the example shown in FIG. 5, the frame counter is incremented from 1 to 8, thereby producing animation frames (b) to (i). For the first animation frame (b) each pixel row is shifted 1 pixel (x=1), while for each subsequent animation frame each pixel row is shifted 2 pixels (x=2). Like the example shown in FIG. 5, frames (a) and (j) show the text block before and after being shimmered, respectively.

Figure 8:
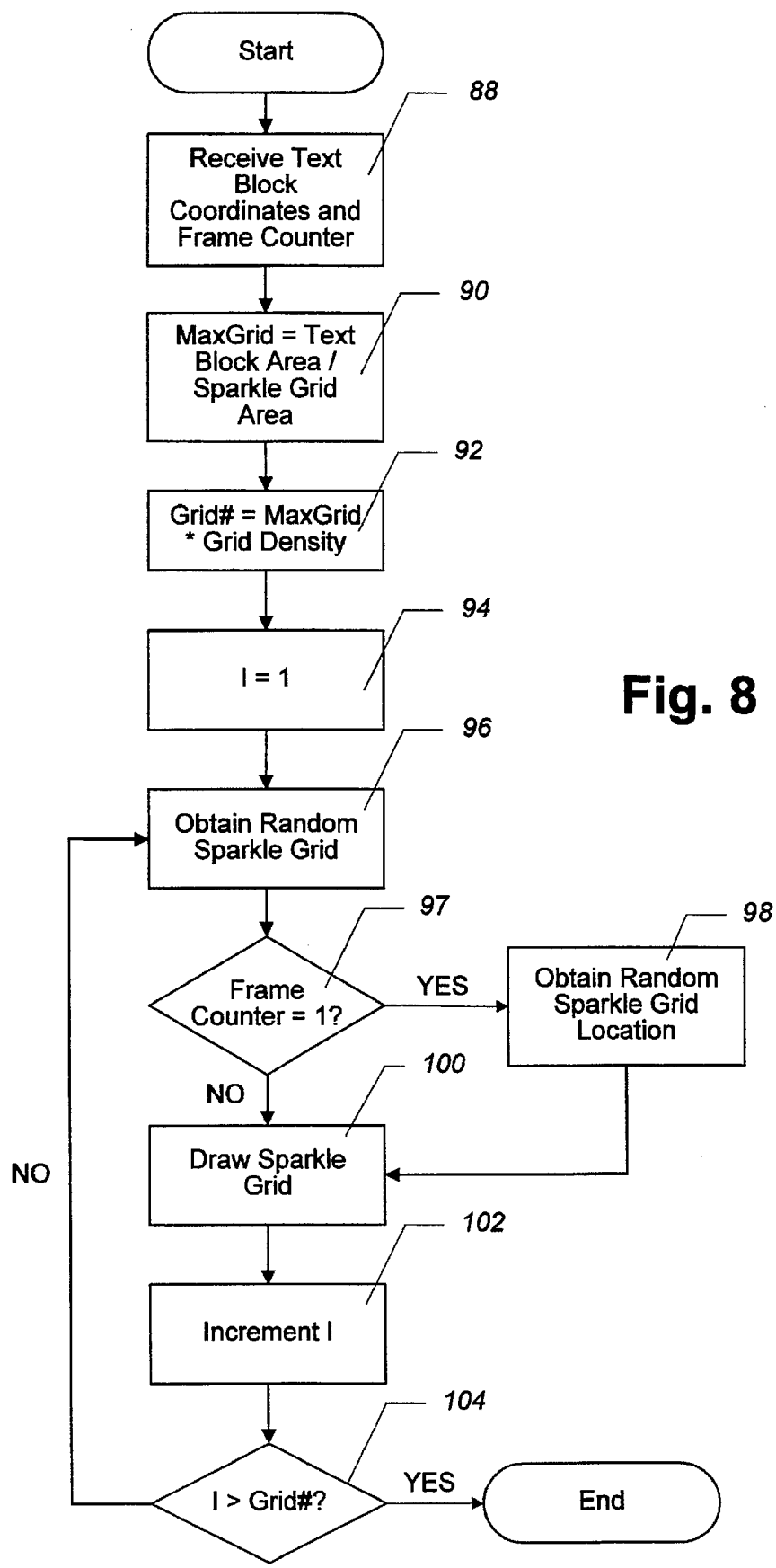
FIG. 8 is a flow diagram of a sparkle special effect generator method according to the present invention.

Shown in FIG. 8 is a method employed by the sparkle effect generator 28C that causes a selected text block to "sparkle." The sparkle effect is implemented by displaying random patterns or sparkle grids in random locations over the text object. The sparkle grids are randomly selected from a predetermined set of sparkle grids. The sparkle grids and colors are changed upon each increment of the frame counter.

In step 88 the sparkle effect generator 28C receives the frame counter and the coordinates of the selected text block. In step 90 the sparkle effect generator computes the maximum number (MaxGrid) of sparkle grids that can fit into the text block which equals the area of the text block divided by the area of each sparkle grid. In the preferred embodiment each sparkle grid is three pixels by three pixels so the sparkle grid area equals nine pixels. In step 92 the sparkle effect generator computes the number of sparkle grids to be displayed on the text block (Grid#) which equals MaxGrid multiplied by a predetermined grid density. The grid density corresponds to the fraction of the text block that is desired to be covered by sparkle grids simultaneously, so is a number between zero and one. Preferably that grid density is selectable by the user.

In step 94 in index counter I is initialized by setting it to equal one. The index counter I counts the number of sparkle grids displayed over the text block. In step 96, the sparkle effect generator 28C obtains a random sparkle grid as the first sparkle grid to be displayed. The sparkle grid is selected from a predetermined set of sparkle grids using a random number generator to generate an index into the set of sparkle grids. The random number generator can use any well-known function for generating a random number. In a preferred embodiment the set of sparkle grids includes various pixel patterns and colors such that each sparkle grid differs from every other sparkle grid by the color of each pixel or the patterns caused by different luminance values for each pixel of the sparkle grid.

In a preferred embodiment, the location of each sparkle grid remains constant for eight animation frames and then is changed for the next eight animation frames. As such, in step 97 the sparkle effect generator 28C determines whether the frame counter equals its initial value of 1. If so, then in step 98 the sparkle effect generator obtains a random sparkle grid location for the current sparkle grid obtained in step 96. Like step 96, step 98 uses a random number generated to generate an index, which in step 98 indexes a location on the text block rather than a sparkle grid. If not, then execution proceeds directly to step 100 in which the sparkle effect generator draws the current sparkle grid at the location previously obtained in step 98. The sparkle effect generator draws the sparkle grid by using a drawing function of the operating system 22. Such drawing functions are well known in the art and are discussed in detail with respect to the Windows graphic user interface on pages 605–658 of Petzold, *Programming Windows* 3.1, published in 1992, which is incorporated by reference herein in its entirety.

In step 102 the index counter I is incremented to get the next sparkle grid to be displayed. In step 104 the sparkle effect generator determines whether the index counter I is greater than Grid#, which is the number of sparkle grids to be displayed. If the index counter I is greater than Grid#, then the sparkle effect generator returns control to the operating system until it is called again. If not, then the sparkle effect generator repeats steps 96 through 104 until Grid# sparkle grids have been displayed.

Shown in FIG. 9 is an example of a text block being sparkled as described in FIG. 8. In this example, frames (b)–(j) are animation frames produced as the frame counter is incremented from 1 to 9. FIG. 9 shows several different sparkle grids having binary pixels, that is, pixels with only 2 different luminance values corresponding to black and white. In a preferred embodiment, the pixels are also colored and have more than two different luminance values.

As described above, the invention provides a system and method for creating and displaying dynamic special effects on graphic text objects. The preferred embodiment employs a frame counter to count animation frames for each special effect. After a predetermined number of animation frames, the text objects are redisplayed without special effects. Discussed above are three examples of dynamic special effects produced according to the invention, with numerous other special effects being apparent from that discussion.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A computer-implemented method of displaying a text object with a special effect that changes how the text object appears, the text object including a sequence of one or more characters, the method comprising:

displaying the text object in a first display format of display pixels forming the character or characters of the text object, wherein the display pixels of the text object are arranged in rows in which a first plurality of rows is consecutively interspersed with a second plurality of rows:

receiving an indication from a user of the special effect desired;

implementing the indicated special effect by adjusting at least some of the display pixels during a first predetermined period, wherein the special effect is a shimmer effect, and the implementing step includes shifting the first plurality of rows of the display pixels in a first direction and shifting the second plurality of rows of the display pixels in a second direction opposite to the first direction; and automatically re-displaying the text object in the first display format upon completion of the first predetermined period.

2. The method according to claim 1 wherein the implementing step includes displaying a predetermined number of special effect animation frames during the first predetermined period, each animation frame resulting from the display pixels of the text object being adjusted.

3. The method according to claim 1 wherein the re-displaying step includes automatically re-displaying the text object in the first display format for a second predetermined period and the method further includes automatically repeating the implementing and re-displaying steps after the second predetermined period.

4. The method according to claim 1, further including:

associating the indicated special effect with the text object in response to receiving the indication from the user;

editing the text object, thereby changing the sequence of characters of the text object; and automatically implementing the special effect on the edited text object.

5. A computer-implemented method of displaying a text object with a special effect that changes how the text object appears, the text object including a sequence of one or more characters, the method comprising:

displaying the text object in a first display format of display pixels forming the sequence of characters of the text object, wherein the display pixels of the text object are arranged in rows in which a first plurality of rows is consecutively interspersed with a second plurality of rows;

implementing the special effect by displaying a sequence of a predetermined plural number of animation frames, each animation frame being created by adjusting automatically one or more of the display pixels of the text object, wherein the special effect is a shimmer effect, and the implementing step includes shifting the first plurality of rows of the display pixels in a first direction and shifting the second plurality of rows of the display pixels in a second direction opposite to the first direction; and automatically re-displaying the text object in the first display format upon completion of the predetermined plural number of animation flames.

6. The method according to claim 5 wherein the sequence of animation frames extend for a first predetermined period and the re-displaying step includes re-displaying the text object in the first display format for a second predetermined period and the method further includes automatically repeating the implementing and re-displaying steps after the second predetermined period.

7. The method according to claim 6 wherein the second predetermined period is at least as long as a time period used to display one animation frame.

8. A computer system for displaying a text object with a special effect on a computer display, the text object including a sequence of one or more characters, the system comprising:

means for displaying the text object on the computer display in a first display format of display pixels forming the sequence of characters of the text object, wherein the display pixels of the text object are arranged in rows in which a first plurality of rows is consecutively interspersed with a second plurality of rows;

means for implementing the special effect by displaying a sequence of a predetermined plural number of animation frames, each animation frame being created by adjusting automatically one or more of the display pixels of the text object, wherein the special effect is a shimmer effect, and the implementing means includes means for shifting the first plurality of rows of the display pixels in a first direction and shifting the second plurality of rows of the display pixels in a second direction opposite to the first direction; and means for automatically re-displaying the text object on the computer display in the first display format upon completion of the predetermined plural number of animation frames.

9. The system according to claim 8 wherein the sequence of animation frames extend for a first predetermined period and the means for re-displaying includes means for re-displaying the text object in the first display format for a second predetermined period and the system further includes means for automatically re-implementing the special effect after the second predetermined period.

10. The system according to claim 9 wherein the second predetermined period is at least as long as a time period used to display one animation frame.

11. A computer-readable memory device for displaying a text object with a special effect that changes how the text object appears, the text object including a sequence of one or more characters, the memory device including computer instructions controlling a computer to perform the following steps:

displaying the text object in a first display format of display pixels forming the sequence of characters of the text object, wherein the display pixels of the text object are arranged in rows in which a first plurality of rows is consecutively interspersed with a second plurality of rows;

implementing the special effect by displaying a sequence of a predetermined plural number of animation frames, each animation frame being created by adjusting automatically one or more of the display pixels of the text object, wherein the special effect is a shimmer effect, and the implementing step includes shifting the first plurality of rows of the display pixels in a first direction and shifting the second plurality of rows of the display pixels in a second direction opposite to the first direction; and automatically re-displaying the text object in the first display format upon completion of the predetermined plural number of animation frames.

12. The memory device of claim 11 further including computer instructions for:

editing the text object in response to editing instructions from a user; and automatically implementing on the edited text object the same special effect implemented on the text object before being edited.

* * * * *

UNITED STATES PATENT AND TRADEMARK OFFICE
CERTIFICATE OF CORRECTION

PATENT NO. : 5,636,340
DATED : June 3, 1997
INVENTOR(S) : Paul R. Bonneau and Christopher A. Mason It is certified that error appears in the above-identified patent and that said Letters Patent is hereby corrected as shown below:

In column 10, claim 5, line 19, please delete "flames" and insert therefor --frames--.

Signed and Sealed this

Seventeenth Day of February, 1998

*Attest:*

BRUCE LEHMAN

*Attesting Officer*   Commissioner of Patents and Trademarks